US010852128B2

(12) United States Patent
Yamagata et al.

(10) Patent No.: US 10,852,128 B2
(45) Date of Patent: Dec. 1, 2020

(54) SHAPE MEASURING APPARATUS

(71) Applicant: MITUTOYO CORPORATION, Kanagawa (JP)

(72) Inventors: Masaoki Yamagata, Kawasaki (JP); Kentaro Nemoto, Kawasaki (JP); Eisuke Moriuchi, Kawasaki (JP); Tadashi Iwamoto, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 548 days.

(21) Appl. No.: 14/184,132

(22) Filed: Feb. 19, 2014

(65) Prior Publication Data
US 2014/0232855 A1 Aug. 21, 2014

(30) Foreign Application Priority Data

Feb. 21, 2013 (JP) .................................. 2013-032094

(51) Int. Cl.
*G01B 11/24* (2006.01)
*G01B 11/25* (2006.01)
*G01B 11/00* (2006.01)

(52) U.S. Cl.
CPC ........ *G01B 11/2518* (2013.01); *G01B 11/007* (2013.01)

(58) Field of Classification Search
None
See application file for complete search history.

(56) References Cited

U.S. PATENT DOCUMENTS 4,790,660 A * 12/1988 Ito .......................... G01B 11/25
356/3.01
4,859,062 A * 8/1989 Thurn .................. G01B 11/303
356/446
6,222,628 B1 * 4/2001 Corallo ................ G01B 11/306
356/601

(Continued)

FOREIGN PATENT DOCUMENTS

EP 0992763 B1 9/2009
EP 2159538 A1 3/2010

(Continued)

OTHER PUBLICATIONS

Machine translation of EP2159538.*

(Continued)

*Primary Examiner* — Mohammad J Rahman
(74) *Attorney, Agent, or Firm* — Greenblum & Bernstein, P.L.C.

(57) ABSTRACT

A shape measuring apparatus includes a first light source, a second light source, an optical system, an image capturer, and a controller. The first light source emits visible light. The second light source emits measurement light used in a measurement. The optical system emits the visible light and the measurement light at the same position on a work piece. The image capturer captures an image of the measurement light reflected by the work piece. The controller is configured to cause the emission of the visible light onto the work piece with the first light source when determining a measurement position, and to control the emission of the measurement light onto the work piece with the second light source when making the measurement.

19 Claims, 12 Drawing Sheets

(56) References Cited

U.S. PATENT DOCUMENTS

| | | | | |
|---|---|---|---|---|
| 6,441,888 B1* | 8/2002 | Azuma | G01S 7/481 | 348/131 |
| 6,542,249 B1* | 4/2003 | Kofman | G01B 11/2513 | 356/601 |
| 7,784,697 B2* | 8/2010 | Johnston | A61B 5/0059 | 235/462.32 |
| 8,553,234 B2 | 10/2013 | Nemoto et al. | | |
| 8,564,656 B2* | 10/2013 | Rauber | G01N 21/8806 | 348/92 |
| 8,929,688 B2* | 1/2015 | Johnston | G06K 9/20 | 358/484 |
| 2003/0151749 A1* | 8/2003 | Kim | G01B 9/02021 | 356/512 |
| 2008/0312866 A1* | 12/2008 | Shimomura | G01B 11/25 | 702/155 |
| 2009/0080735 A1* | 3/2009 | Chapman | G06T 7/0004 | 382/128 |
| 2010/0103256 A1* | 4/2010 | Rauber | G01N 21/8806 | 348/92 |
| 2010/0112899 A1* | 5/2010 | Hofer | B24B 19/14 | 451/5 |
| 2010/0128990 A1* | 5/2010 | Seppala | G01B 11/30 | 382/203 |
| 2010/0156953 A1* | 6/2010 | Nevitt | F21V 7/04 | 345/690 |
| 2012/0262726 A1* | 10/2012 | Nemoto | G01B 11/03 | 356/612 |
| 2014/0071239 A1* | 3/2014 | Yokota | A61B 1/0005 | 348/45 |

FOREIGN PATENT DOCUMENTS

| | | |
|---|---|---|
| JP | 2009-534969 | 9/2009 |
| WO | WO2007/125081 | 11/2007 |

OTHER PUBLICATIONS

Search report from E.P.O. (EP Appl. No. 14000574.5), dated Apr. 29, 2014.

U.S. Appl. No. 14/217,704 to Osamu Saito et al., filed Mar. 18, 2014.

U.S. Appl. No. 13/425,762 to Kentaro Nemoto et al., filed Mar. 21, 2012.

U.S. Appl. No. 14/197,715 to Masaoki Yamagata et al., filed Mar. 5, 2014.

\* cited by examiner

SHAPE MEASURING APPARATUS

CROSS-REFERENCE TO RELATED APPLICATIONS

The present application claims priority under 35 U.S.C. § 119 of Japanese Application No. 2013-032094, filed on Feb. 21, 2013, the disclosure of which is expressly incorporated by reference herein in its entirety.

BACKGROUND OF THE INVENTION

1. Field of the Invention

The present disclosure relates to a shape measuring apparatus measuring a shape of a measured object by emitting light at the measured object and capturing an image thereof.

2. Description of Related Art

Conventionally, a shape measuring apparatus is known in which a surface shape of a work piece is measured by scanning a surface of the work piece with a probe and importing position coordinates and the like of each portion of the work piece. As an example of such a shape measuring apparatus, a non-contact-type shape measuring apparatus is known in which measurement is performed without a probe touching a surface of a work piece, as in Japanese Publication of PCT International Application No. 2009-534969.

In the non-contact-type surface shape measuring apparatus according to Japanese Publication of PCT International Application No. 2009-534969, the surface shape of the work piece is measured by a scanning probe firing a line laser having a straight line shape onto the surface of the work piece and capturing an image thereof from a predetermined angle with respect to a laser firing direction. According to the non-contact-type surface shape measuring apparatus of this kind, there is no risk of damaging the surface of the work piece and there is no need to consider an effect of probe abrasion on measurement accuracy.

However, when the work piece is transparent, for example, reflected light cannot be adequately received unless the line laser is infrared light. In other words, measurement errors arise due to a wavelength of the line laser. Meanwhile, when the fired light is infrared light, a user of the apparatus cannot visually confirm a measurement position.

SUMMARY OF THE INVENTION

The present disclosure has been devised in order to address the circumstances above, and provides a shape measuring apparatus capable of inhibiting measurement errors and enabling a measurement position to be readily confirmed.

A shape measuring apparatus according to the present disclosure includes a first light source, a second light source, an optical system, an image capturer, and a controller. The first light source fires (i.e., emits) visible light. The second light source fires (i.e., emits) measurement light used in a measurement. The optical system fires (i.e., emits) the visible light and the measurement light at the same position on a work piece. The image capturer captures an image of the measurement light reflected by the work piece. The controller fires (i.e., emits) visible light onto the work piece with the first light source when determining the measurement position, and fires the measurement light onto the work piece with the second light source when making the measurement.

According to the present disclosure, a shape measuring apparatus can be provided that is capable of inhibiting measurement errors and that enables a measurement position to be readily confirmed.

BRIEF DESCRIPTION OF THE DRAWINGS

The present disclosure is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
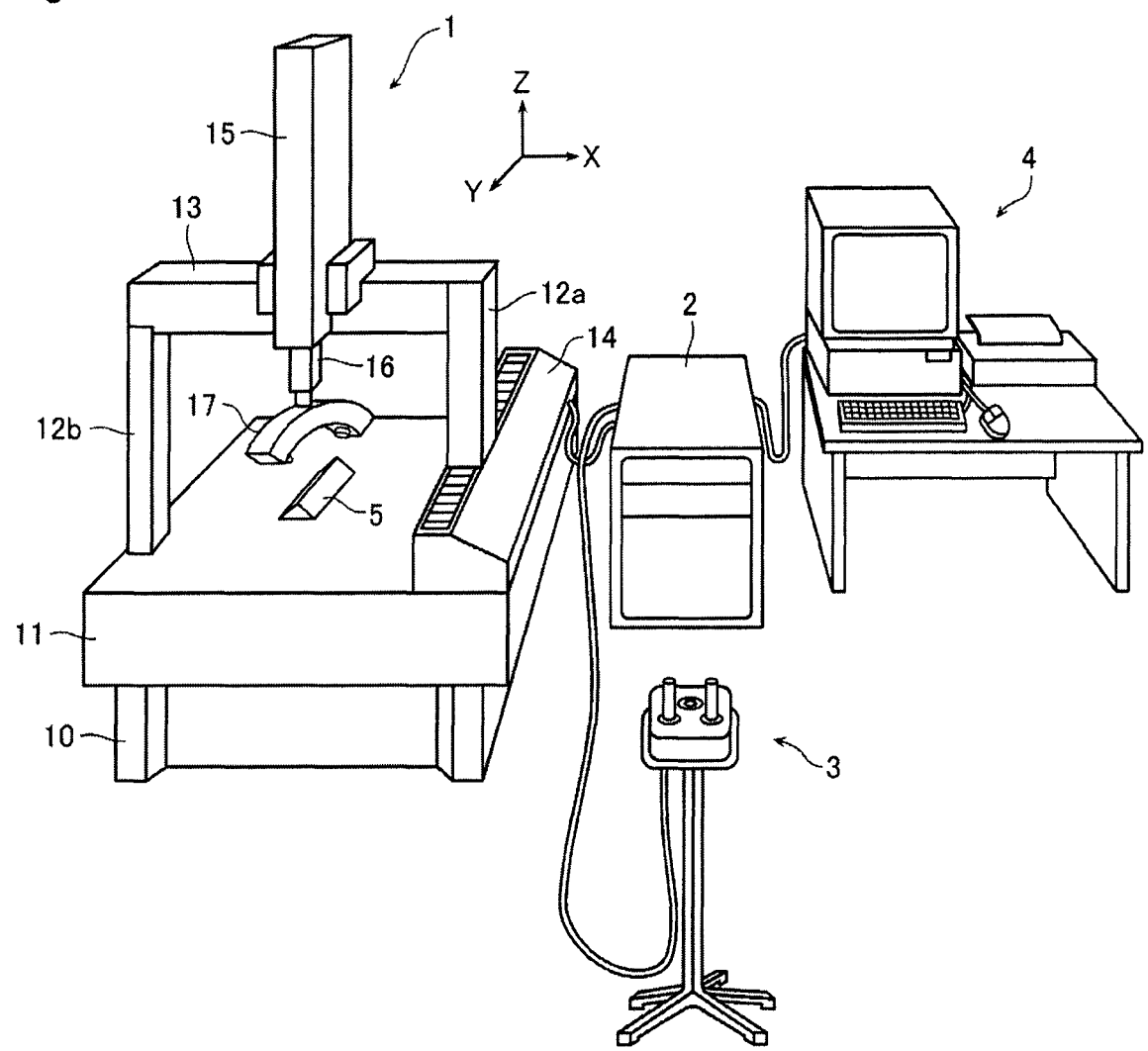
FIG. 1 is an overall view of a system configuring a shape measuring apparatus according to a first embodiment of the present disclosure.

A shape measuring apparatus according to a first embodiment of the present disclosure is described in detail with reference to the drawings. FIG. 1 is an overall view of a system configuring the shape measuring apparatus according to the first embodiment. As shown in FIG. 1, the shape measuring apparatus is configured by mounting an optical probe 17 according to the present embodiment as a measurement probe of a coordinate measuring apparatus 1. The shape measuring apparatus is configured from a motion control apparatus 2, an operation panel 3, and a host system 4. The motion control apparatus 2 controls activation of the coordinate measuring apparatus 1, and also imports required measurement coordinate values from the coordinate measuring apparatus 1. The operation panel 3 manually operates the coordinate measuring apparatus 1 via the motion control apparatus 2. The host system 4 compiles and executes a part program giving an instruction for a measurement procedure in the motion control apparatus 2. The host system 4 also performs calculation to apply a geometric shape to the measurement coordinate values imported via the motion control apparatus 2, stores and transmits the part program, and the like.

The coordinate measuring apparatus 1 is configured as follows. Specifically, a stage 11 is placed on the top of an anti-vibration table 10 such that a top surface of the stage 11 (serving as a base surface) is aligned with a horizontal plane, then arm support members 12a and 12b are erected at both lateral ends of the stage 11 and an X-axis guide 13 is supported at an upper end of the arm support members 12a and 12b. A lower end of the arm support member 12a is driven in a Y-axis direction by a Y-axis drive mechanism 14, while a lower end of the arm support member 12b is supported on top of the stage 11 by an air bearing so as to be capable of displacement in the Y-axis direction. The X-axis guide 13 drives a Z-axis guide 15 in the X-axis direction, the Z-axis guide 15 extending in a perpendicular direction. A Z-axis arm 16 is provided to the Z-axis guide 15 so as to be driven along the Z-axis guide 15, and a non-contact-type optical probe 17 is mounted to a lower end of the Z-axis arm 16. Moreover, the optical probe 17 may be rotatable within the horizontal plane, and may be rotatable within a perpendicular plane.

Figure 2:
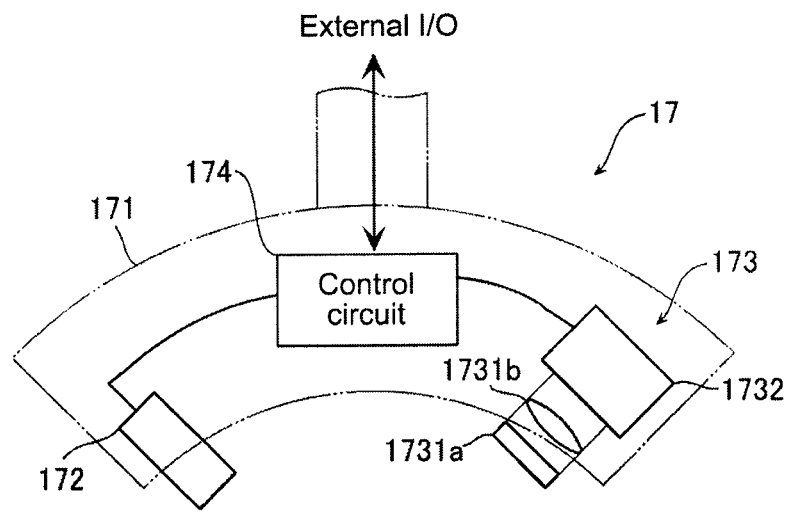
FIG. 2 illustrates a configuration of an optical probe 17 according to the first embodiment.

FIG. 2 illustrates a configuration of the optical probe 17 according to the present embodiment. As shown in FIG. 2, the optical probe 17 includes a casing 171; a laser light generator 172 arranged within the casing 171; an image capture apparatus 173 capturing an image of a work piece 5; and a control circuit 174 adjusting an amount of light intensity emitted from a plurality of light sources within the laser light generator 172. Detailed configurations of the laser light generator 172 and controls for the configurations are discussed hereafter.

The laser light generator 172 fires a line laser toward the work piece 5 and shines in a straight line onto a surface of the work piece 5, the line laser having a straight line shape spreading in a direction orthogonal to a plane formed by an optical axis of the laser light generator 172 described hereafter (the optical axis in a center of a scan direction), and an optical axis of the image capture apparatus 173.

The image capture apparatus 173 includes a filter 1731a, a lens 1731b, and a CMOS sensor 1732 capturing an image of the work piece 5 via these components. The image capture apparatus 173 is arranged so as to receive light from a direction at a predetermined angle with respect to an illumination direction of light from the light sources toward the work piece 5. In other words, light fired onto the surface of the work piece 5 and reflected along the shape of the surface of the work piece 5 is received from the predetermined angle by the image capture apparatus 173.

Figure 3A:
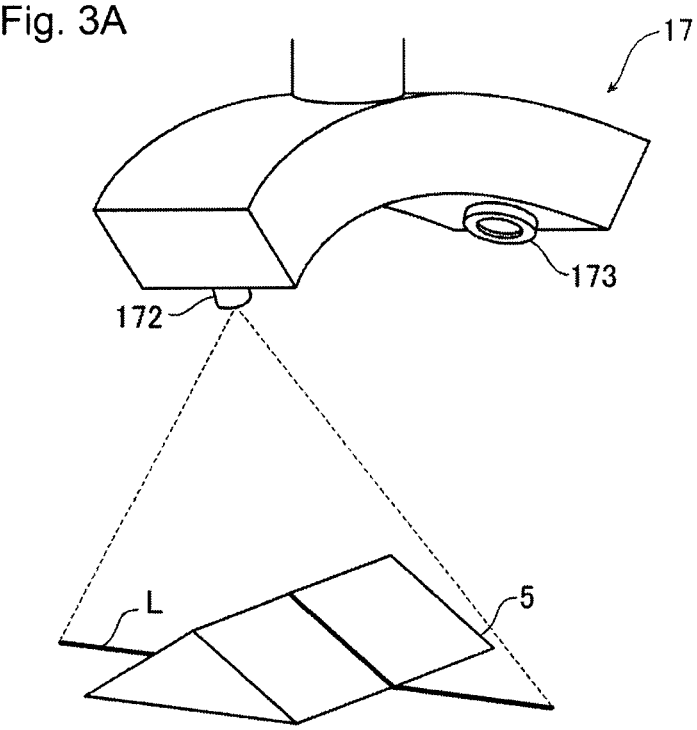
FIGS. 3A and 3B are schematic views illustrating a line laser fired using the optical probe 17.
Figure 3B:
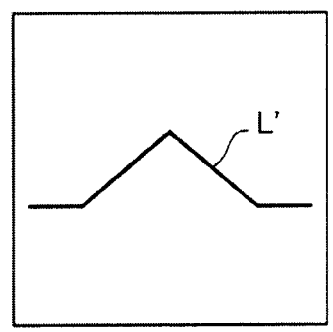

FIGS. 3A and 3B are schematic views illustrating the line laser fired using the optical probe 17. As shown in FIG. 3A, when the straight line laser L is fired at the work piece 5 by the laser light generator 172, reflected light of the line laser L is deformed along the surface of the work piece 5, illuminating an outline of the work piece 5 as sliced at a certain plane. As shown in FIG. 3B, the image capture apparatus 173 captures an image of the work piece 5 at a predetermined angle from the laser light illumination direction of the laser light generator 172, then an image of reflected light L' of the line laser is captured.

Figure 4:
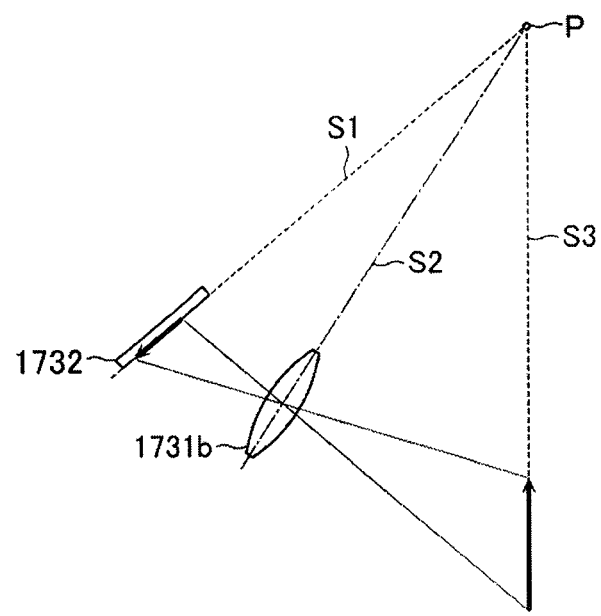
FIG. 4 is a schematic view illustrating an arrangement within the optical probe 17.

FIG. 4 is a schematic view illustrating an arrangement within the optical probe 17. The filter 1731a is omitted from FIG. 4. The Scheimpflug principle is used in the optical probe 17 according to the present embodiment. As shown in FIG. 4, extended planes S1 to S3 of, respectively, an image capture plane of the CMOS sensor 1732, a principal plane that includes a principal point of the lens 1731b, and an illumination plane of the line laser fired at the work piece 5 intersect at a single point P. With such an arrangement, the entire work piece 5 in the image capture plane of the CMOS sensor 1732 is in focus.

Figure 5:
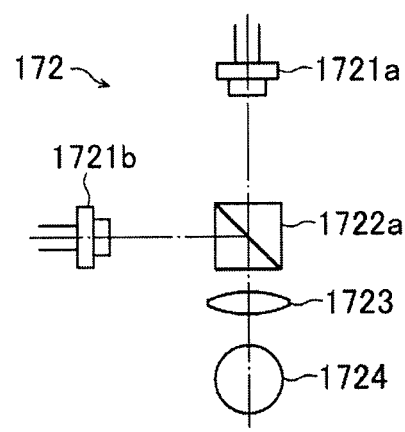
FIG. 5 is a schematic view illustrating a laser light generator 172 according to the first embodiment.

FIG. 5 is a schematic view illustrating the laser light generator 172 according to the present embodiment. As shown in FIG. 5, the laser light generator 172 includes the first light source 1721a firing visible light (red light, for example) and the second light source 1721b firing infrared light used in a measurement (measurement light). The visible light fired from the first light source 1721a is transmitted through a beam splitter 1722a and reaches a collimator lens 1723. Meanwhile, the infrared light fired from the second light source 1721b is reflected by the beam splitter 1722a to reach the collimator lens 1723. In addition, after the visible light or infrared light fired from the first and second light sources 1721a and 1721b, respectively, passes through the collimator lens 1723, the light is scattered by a beam expander 1724 to form the line laser. The beam splitter 1722a, collimator lens 1723, and the beam expander 1724 (optical system) are arranged such that the visible light and the infrared light can be fired in a straight line at the same position of the work piece 5. Moreover, the beam expander 1724 is, for example, a rod lens or a cylindrical lens.

Figure 6:
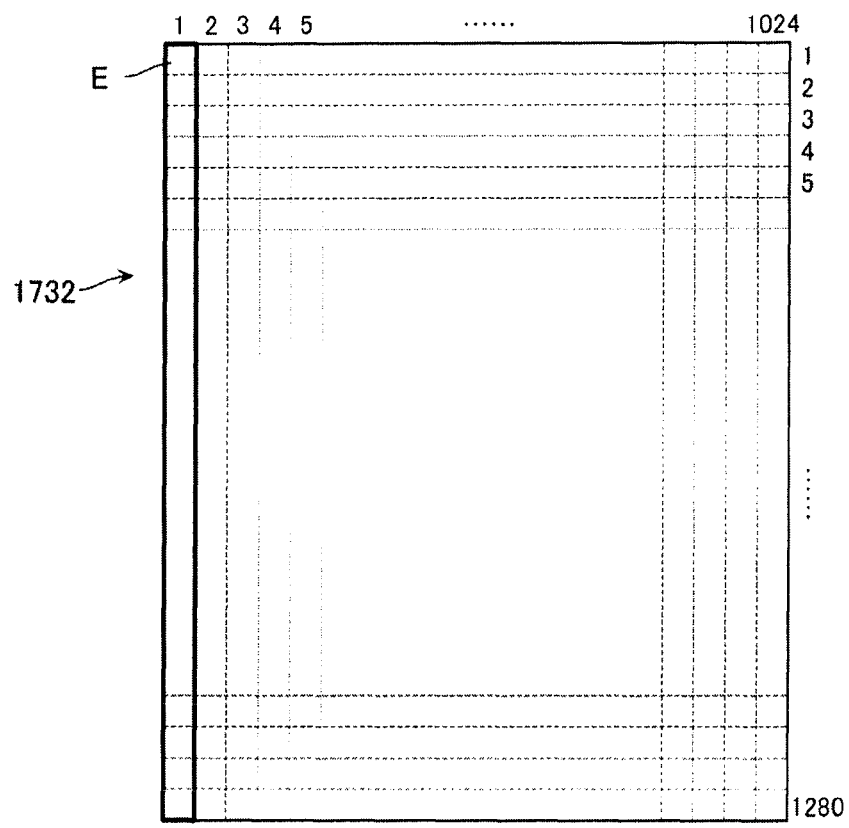
FIG. 6 is a frame view illustrating a CMOS sensor 1732 according to the first embodiment.

FIG. 6 is a frame view illustrating the CMOS sensor 1732 according to the present embodiment. As shown in FIG. 6, the CMOS sensor 1732 includes a plurality of image capture elements arranged in a matrix. For example, in the present embodiment, the CMOS sensor 1732 includes 1024 photo detectors (CMOS cells) in a direction in which the straight line laser light extends and 1280 photo detectors (CMOS cells) in a direction orthogonal thereto. Further, the CMOS sensor 1732 includes a rolling shutter function. The rolling shutter function is a method in which only the photo detectors elements arranged in one or a plurality of rows (or columns) receive light simultaneously, and the light reception of the row unit (or column unit) is performed in sequence in a columnar direction (or row direction). For example, in FIG. 6, light reception of the photo detectors arranged in a first row (photo detectors emphasized with a thick frame) is performed simultaneously. When the light reception operation is complete, light reception is performed in sequence with a second row and third row.

Figure 7:
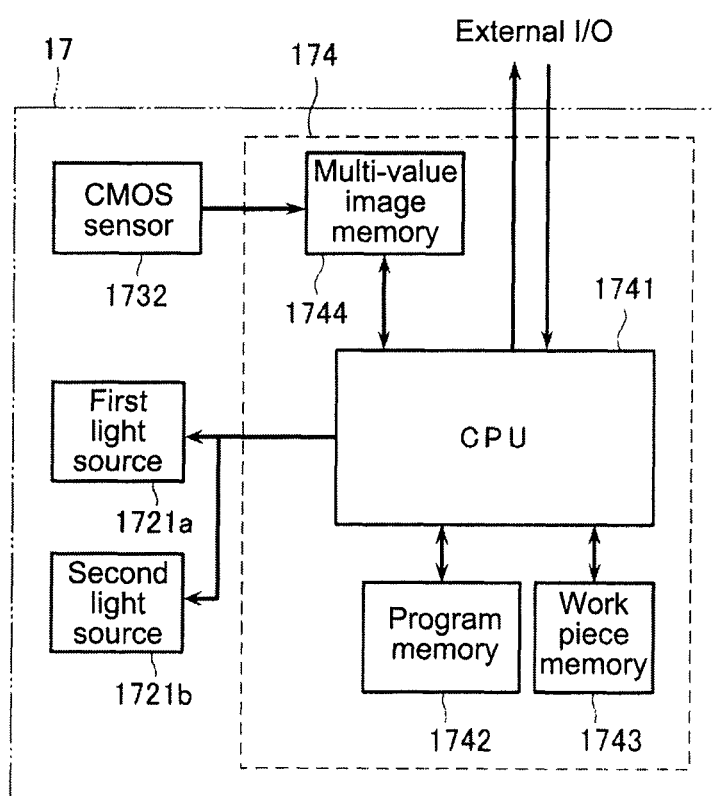
FIG. 7 is a block diagram illustrating a control schema of the optical probe 17.

FIG. 7 is a block diagram illustrating a control schema of the optical probe 17 according to the present embodiment. As shown in FIG. 7, the control circuit 174 includes a CPU 1741, a program memory 1742 connected to the CPU 1741, a work piece memory 1743, and a multi-value image memory 1744. Image data obtained by the CMOS sensor 1732 is input to the CPU 1741 via the multi-value image memory 1744. The CPU 1741 controls an activation status of the first and second light sources 1721a and 1721b, respectively.

Figure 8:
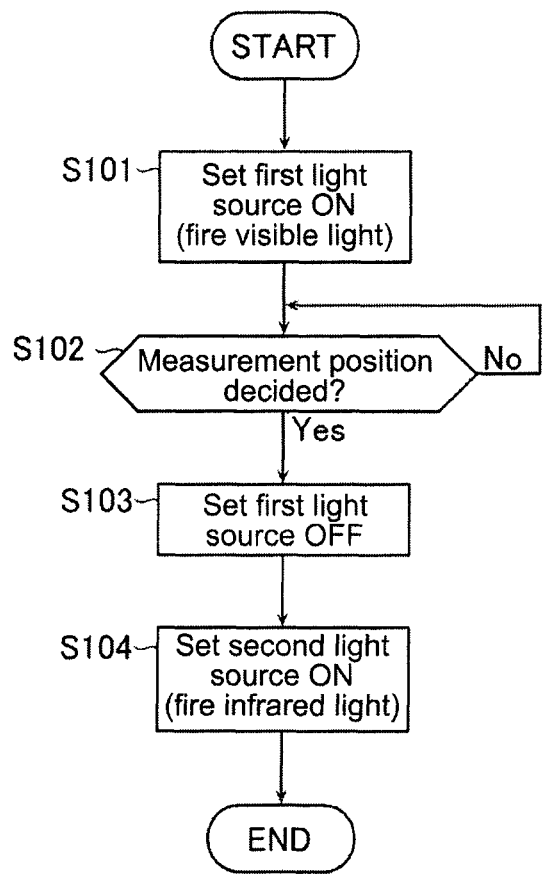
FIG. 8 is a flowchart illustrating driving of a first light source 1721a and a second light source 1721b according to the first embodiment.
Figure 9A:
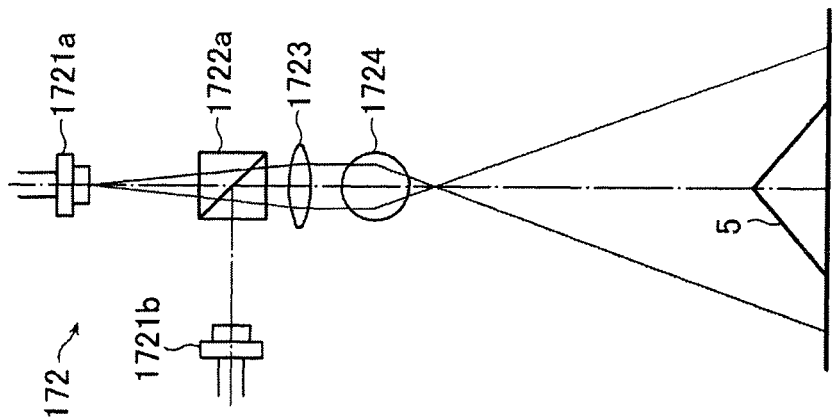
FIG. 9A is a schematic view illustrating an activated state of the first light source 1721a and the second light source 1721b.
Figure 9B:
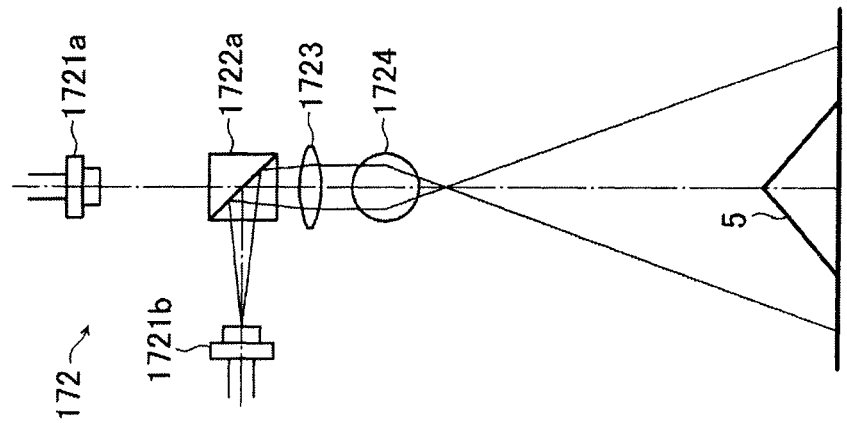
FIG. 9B is a schematic view illustrating an activated state of the first light source 1721a and the second light source 1721b.

Next, operations of the shape measuring apparatus according to the first embodiment are described with reference to FIGS. 8, 9A, and 9B. FIG. 8 is a flowchart illustrating the activation of the first light source 1721a and the second light source 1721b. FIGS. 9A and 9B are schematic views illustrating activated states of the first light source 1721a and the second light source 1721b, respectively.

As shown in FIG. 8, first, the control circuit 174 sets the first light source 1721a to the activated state (ON) (S101). Thereby, as shown in FIG. 9A, the laser light generator 172 fires visible light at the work piece 5 as the line laser. Next, a confirmation is made as to whether a measurement position has been decided (S102). When the measurement position has not been decided (S102—No), the process of step S102 is repeated.

When the measurement position has been decided (S102—Yes), the control circuit 174 sets the first light source 1721a to a deactivated state (OFF) (S103). Thereby, the laser light generator 172 stops firing the visible light. Next, the control circuit 174 sets the second light source 1721b to the activated state (ON) (S104). Thereby, as shown in FIG. 9B, the laser light generator 172 fires infrared light at the work piece 5 as the line laser and shape measurement of the work piece 5 is performed.

In the present embodiment, above, the control circuit 174 fires visible light at the work piece 5 when deciding the measurement position. Accordingly, a user of the shape measuring apparatus can readily confirm the measurement position visually using the visible light. In addition, in the present embodiment, the control circuit 174 fires infrared light at the work piece 5 when making the measurement. Accordingly, even when the work piece 5 is transparent, the present embodiment can obtain adequate reflected light from the work piece 5. In other words, the present embodiment is capable of inhibiting a measurement error.

Second Embodiment

Figure 10:
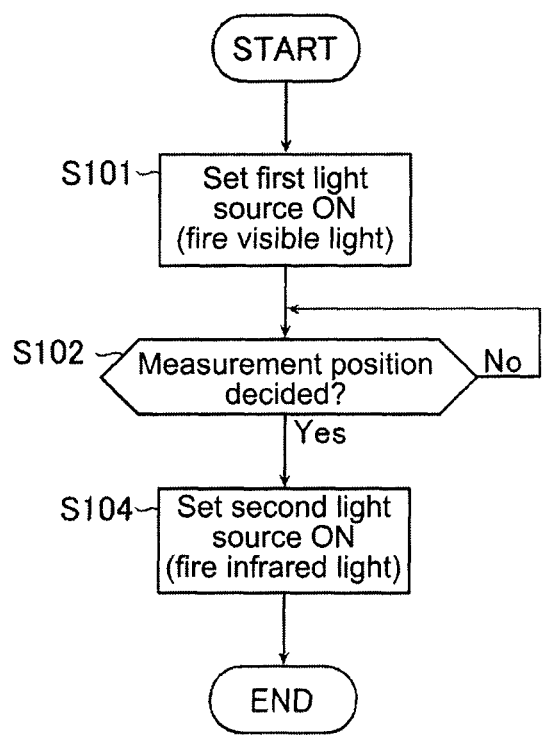
FIG. 10 is a flowchart illustrating activation of the first light source 1721a and the second light source 1721b according to a second embodiment.
Figure 11:
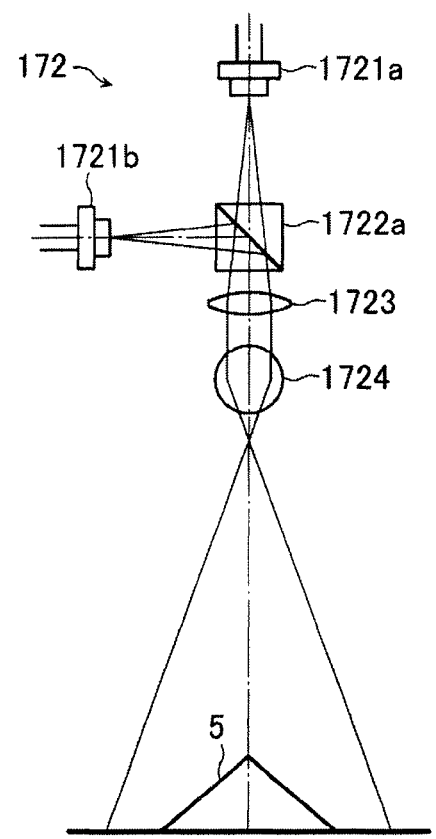
FIG. 11 is a schematic view illustrating an activated state of the first light source 1721a and the second light source 1721b.

Next, a shape measuring apparatus according to a second embodiment is described. As shown in FIG. 10, in the shape measuring apparatus according to the second embodiment, when the measurement position is decided (S102—Yes), the control circuit 174 omits the process of step S103 and executes the process of step S104. Thereby, as shown in FIG. 11, the laser light generator 172 fires visible light and infrared light as the line laser and shape measurement of the work piece 5 is performed. Even with the above-noted control, the second embodiment produces similar results to the first embodiment. In addition, in the second embodiment, the user can readily confirm the measurement position visually even during measurement.

Third Embodiment

Figure 12:
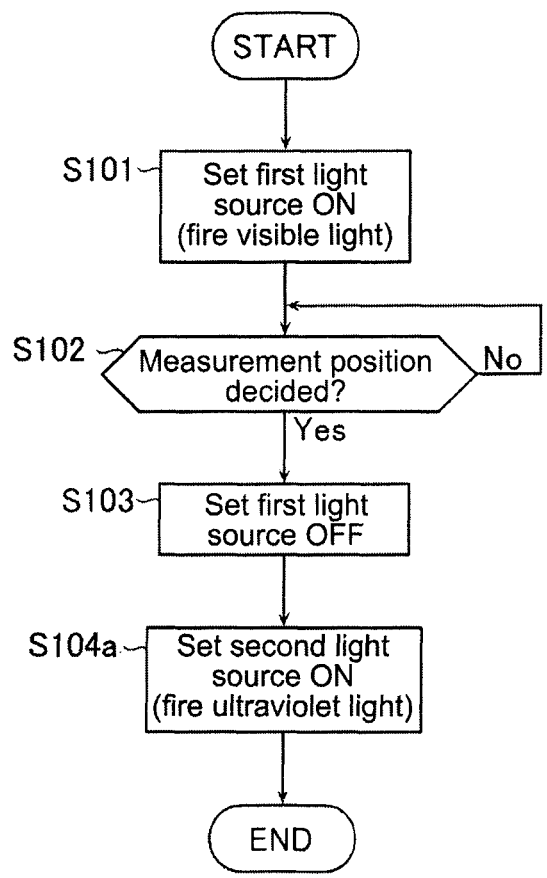
FIG. 12 is a flowchart illustrating activation of the first light source 1721a and the second light source 1721b according to a third embodiment.

Next, a shape measuring apparatus according to a third embodiment is described. In the third embodiment, the second light source 1721b fires ultraviolet light, differing from the first embodiment in this respect. As shown in FIG. 12, after step S103, the second light source 1721b is set to the activated state (ON) (S104a). Thereby, the laser light generator 172 fires ultraviolet light at the work piece 5 as the line laser and shape measurement of the work piece 5 is performed.

In the third embodiment, in a manner similar to the first embodiment, the user of the shape measuring apparatus can readily confirm the measurement position visually using the visible light. In addition, in the present embodiment, the measurement is performed by firing ultraviolet light. Accordingly, the present embodiment can execute measurement at a higher resolution than the first embodiment.

Fourth Embodiment

Figure 13:
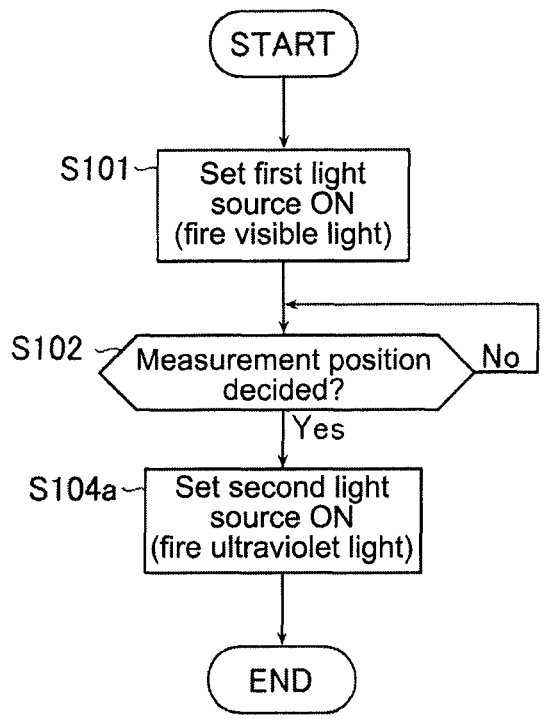
FIG. 13 is a flowchart illustrating activation of the first light source 1721a and the second light source 1721b according to a fourth embodiment.

Next, a shape measuring apparatus according to a fourth embodiment is described. In the shape measuring apparatus according to the fourth embodiment, in a manner similar to the third embodiment, the second light source 1721b fires ultraviolet light. As shown in FIG. 13, in a case where the measurement position has been decided (S102—Yes), step S103 is omitted and the second light source 1721b is set to the activated state (ON) (S104a). Thereby, the laser light generator 172 fires ultraviolet light and visible light as the line laser and shape measurement of the work piece 5 is performed. Even with the above-noted control, the fourth embodiment produces similar results to the third embodiment. In addition, in the fourth embodiment, the user can readily confirm the measurement position visually even during measurement.

Fifth Embodiment

Figure 14:
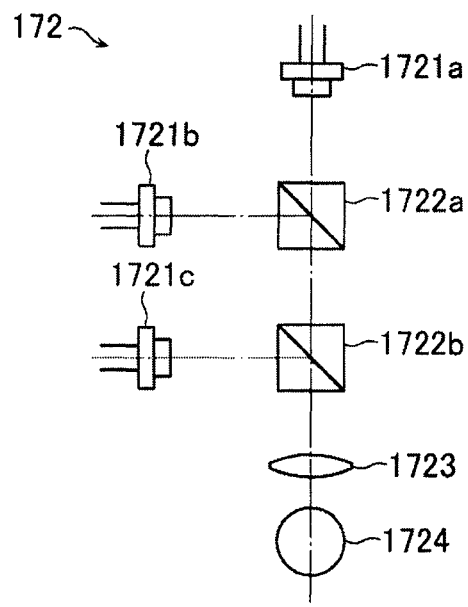
FIG. 14 is a schematic view illustrating the laser light generator 172 according to a fifth embodiment.

Next, a shape measuring apparatus according to a fifth embodiment is described. As shown in FIG. 14, in addition to the configuration of the first embodiment, the laser light generator 172 according to the fifth embodiment further includes a third light source 1721c and a beam splitter 1722b. The third light source 1721c fires light that includes wavelengths outside the wavelengths of the light fired by the first and second light sources 1721a and 1721b, respectively.

As shown in FIG. 14, light from the first and second light sources 1721a and 1721b, respectively, reaches the collimator lens 1723 via the beam splitters 1722a and 1722b. Light from the third light source 1721c is reflected by the beam splitter 1722b to reach the collimator lens 1723. In this way, the fifth embodiment produces similar results to the first embodiment.

OTHER EMBODIMENTS

Figure 15:
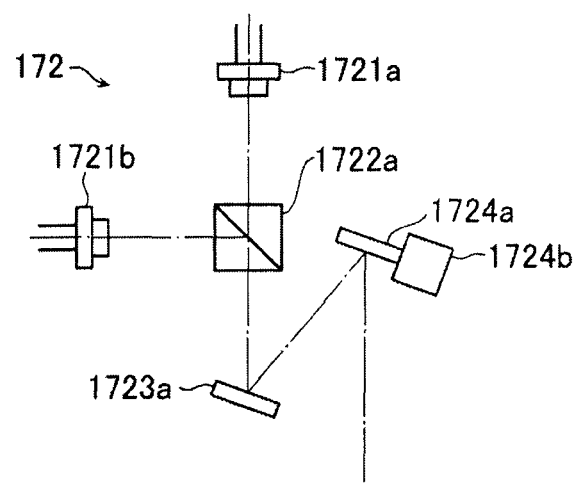
FIG. 15 is a schematic view illustrating the laser light generator 172 according to another embodiment.

Above, a description was given of embodiments of the shape measuring apparatus according to the present disclosure. However, the present invention is not limited to the above-noted embodiments and various modifications, additions, substitutions, and the like are possible without departing from the scope of the invention. For example, as shown in FIG. 15, the laser light generator 172 may be configured to include a mirror 1723a and a galvano-mirror 1724a instead of the collimator lens 1723 and the beam splitter 1724. The mirror 1723a reflects light fired from the first and second light sources 1721a and 1721b, respectively, toward the galvano-mirror 1724a. The galvano-mirror 1724a is rotated by a galvanometer 1724b within a predetermined angular range. Accordingly, the galvano-mirror 1724a sweeps the light fired from the first and second light sources 1721*a* and 1721*b*, respectively, in a straight line form.

In addition, a description was given in the above embodiments using the CMOS sensor 1732 as the image capture element. However, the image capture element may also be an image sensor such as a CCD.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A shape measuring apparatus comprising:
   a first light source configured to emit visible light;
   a second light source configured to emit measurement light used in a measurement;
   an optical system configured to emit the visible light and the measurement light at the same position on a work piece;
   an image capturer configured to capture an image of the measurement light reflected by the work piece; and
   a controller configured to control the emission of the visible light onto the work piece with the first light source when determining a measurement position, and further configured to after the measurement position has been determined, initiate and control the emission of the measurement light onto the work piece with the second light source, after stopping the emission of the visible light onto the work piece, when making the measurement.

2. The shape measuring apparatus according to claim 1, wherein the measurement light is invisible light.

3. The shape measuring apparatus according claim 1, wherein the measurement light is infrared light.

4. The shape measuring apparatus according to claim 2, wherein the measurement light is infrared light.

5. The shape measuring apparatus according to claim 1, wherein the measurement light is ultraviolet light.

6. The shape measuring apparatus according to claim 2, wherein the measurement light is ultraviolet light.

7. The shape measuring apparatus according to claim 1, wherein the optical system is further configured to emit the visible light and the measurement light along a straight line scanning direction.

8. The shape measuring apparatus according to claim 2, wherein the optical system is further configured to emit the visible light and the measurement light along a straight line scanning direction.

9. The shape measuring apparatus according to claim 3, wherein the optical system is further configured to emit the visible light and the measurement light along a straight line scanning direction.

10. The shape measuring apparatus according to claim 4, wherein the optical system is further configured to emit the visible light and the measurement light along a straight line scanning direction.

11. The shape measuring apparatus according to claim 5, wherein the optical system is further configured to emit the visible light and the measurement light along a straight line scanning direction.

12. The shape measuring apparatus according to claim 6, wherein the optical system is further configured to emit the visible light and the measurement light along a straight line scanning direction.

13. The shape measuring apparatus according to claim 1, wherein the optical system is further configured to sweep the visible light and the measurement light along a straight line scanning direction.

14. The shape measuring apparatus according to claim 2, wherein the optical system is further configured to sweep the visible light and the measurement light along a straight line scanning direction.

15. The shape measuring apparatus according to claim 3, wherein the optical system is further configured to sweep the visible light and the measurement light along a straight line scanning direction.

16. The shape measuring apparatus according to claim 4, wherein the optical system is further configured to sweep the visible light and the measurement light along a straight line scanning direction.

17. The shape measuring apparatus according to claim 5, wherein the optical system is further configured to sweep the visible light and the measurement light along a straight line scanning direction.

18. The shape measuring apparatus according to claim 6, wherein the optical system is further configured to sweep the visible light and the measurement light along a straight line scanning direction.

19. The shape measuring apparatus according to claim 1, wherein the work piece is transparent.

\* \* \* \* \*